United States Patent
Li et al.

(10) Patent No.: US 8,175,254 B2
(45) Date of Patent: May 8, 2012

(54) PREDICTION OF THRESHOLD EXCEPTIONS BASED ON REAL TIME OPERATING INFORMATION

(75) Inventors: Hongguang Li, Broomfield, CO (US); Henry R. Paddock, Boulder, CO (US); Lynn R. Smith, Westminster, CO (US); Katherine R. Sobus, Wilmington, DE (US)

(73) Assignee: Avaya Inc., Basking Ridge, NJ (US)

( * ) Notice: Subject to any disclaimer, the term of this patent is extended or adjusted under 35 U.S.C. 154(b) by 497 days.

(21) Appl. No.: 12/429,032

(22) Filed: Apr. 23, 2009

(65) Prior Publication Data

US 2010/0274637 A1   Oct. 28, 2010

(51) Int. Cl.
*H04M 3/00* (2006.01)
(52) U.S. Cl. .................. 379/265.08; 379/265.14; 705/11
(58) Field of Classification Search ............. 379/265.06; 705/11; 706/52
See application file for complete search history.

(56) References Cited

U.S. PATENT DOCUMENTS

| | | | |
|---|---|---|---|
| 5,903,641 A * | 5/1999 | Tonisson | 379/265.12 |
| 6,282,282 B1 * | 8/2001 | Wineberg et al. | 379/265.02 |
| 6,614,903 B1 * | 9/2003 | Flockhart et al. | 379/265.12 |
| 6,724,884 B2 | 4/2004 | Jensen et al. | |
| 6,741,698 B1 | 5/2004 | Jensen | |
| 2009/0063437 A1 * | 3/2009 | Hendrey et al. | 707/4 |
| 2009/0276761 A1 * | 11/2009 | Saeed | 717/127 |
| 2010/0020961 A1 * | 1/2010 | Spottiswoode | 379/265.12 |
| 2010/0169067 A1 * | 7/2010 | Basel et al. | 703/21 |

* cited by examiner

*Primary Examiner* — Creighton Smith
(74) *Attorney, Agent, or Firm* — Sheridan Ross P.C.

(57) ABSTRACT

A contact center includes a real time threshold prediction module that determines that a selected performance measure will, during a future time interval, likely cross a selected threshold and, in response, performs at least one of the following operations: (i) determines, for the likely crossing of the selected threshold, a consequence in a selected service level agreement and determines a set of corrective actions to reduce a likelihood that the selected performance measure will cross the selected threshold.

20 Claims, 4 Drawing Sheets

PREDICTION OF THRESHOLD EXCEPTIONS BASED ON REAL TIME OPERATING INFORMATION

FIELD

The invention relates generally to contact centers and particularly to contact center monitoring and control.

BACKGROUND

Contact centers are employed by many enterprises to service inbound and outbound contacts from customers. A typical contact center includes a switch and/or server to receive and route incoming packet-switched and/or circuit-switched contacts and one or more resources, such as human agents and automated resources (e.g., Interactive Voice Response (IVR) units), to service the incoming contacts. Contact centers distribute contacts, whether inbound or outbound, for servicing to any suitable resource according to predefined criteria. In many existing systems, the criteria for servicing the contact from the moment that the contact center becomes aware of the contact until the contact is connected to an agent are client or operator-specifiable (i.e., programmable by the operator of the contact center), via a capability called vectoring. Normally in present-day ACDs when the ACD system's controller detects that an agent has become available to handle a contact, the controller identifies all predefined contact-handling queues for the agent (usually in some order of priority) and delivers to the agent the highest-priority, oldest contact that matches the agent's highest-priority queue. Generally, the only condition that results in a contact not being delivered to an available agent is that there are no contacts waiting to be handled.

The primary objective of contact center management is to ultimately maximize contact center performance and profitability. An ongoing challenge in contact center administration is monitoring and optimizing contact center efficiency. Contact center efficiency is generally measured in two ways.

Service level is one measurement of contact center efficiency. Service level is typically determined by dividing the number of contacts accepted within the specified period by the number accepted plus the number that were not accepted, but completed in some other way (e.g., abandoned, given busy, canceled, flowed out). Of course, service level definitions may vary from one enterprise to another.

Match rate is another indicator used in measuring contact center efficiency. Match rate is usually determined by dividing the number of contacts accepted by a primary skill level agent within a period of time by the number of contacts accepted by any agent for a queue over the same period. An agent with a primary skill level is one that typically can handle contacts of a certain nature most effectively and/or efficiently. There are other contact center agents that may not be as proficient as the primary skill level agent, and those agents are identified either as secondary skill level agents or backup skill level agents. As can be appreciated, contacts received by a primary skill level agent are typically handled more quickly and accurately or effectively (e.g., higher revenue attained) than a contact received by a secondary or even backup skill level agent. Thus, it is an objective of most contact centers to optimize match rate along with service level.

In addition to service level and match rate performance measures, contact centers use other Key Performance Indicators ("KPIs"), such as revenue, estimated, actual, or predicted wait time, average speed of answer, and the like, to calculate performance relative to their Service Level Agreements ("SLAs"). Operational efficiency is achieved when KPIs are managed near, but not above, SLA levels. Many contact centers use administered thresholds to report and track KPI and SLA performance.

Threshold management is a complex task. In the simplest cases, exceeding a given KPI threshold (i.e., revenue) indicates overperformance and is considered positive for the enterprise. In other cases, exceeding a KPI threshold (i.e., estimated, actual, or predicted wait time) indicates underperformance. When the SLA is not met, there is a negative end result for the enterprise and a monetary penalty may apply. Additionally, overperformance of some KPIs (i.e., average speed of answer) are considered inefficient for the enterprise because they indicate excess resource cost. Ideally, contact centers would like to maximize operating efficiency by operating at or near a given KPI with little deviation.

Currently, Avaya IQ™ and CMS™ by Avaya, Inc., can track KPIs historically relative to a selected threshold. Each time a report refreshes with new data, the updated KPI value is shown. If the KPI is close to a threshold, the report can provide a visual or audible alarm to the operator. When a threshold is crossed, the operator is left to his or her own devices to determine what needs to be done. Management systems cannot predict if and when the threshold would be met or exceeded let alone understand the penalties for failing to meet a threshold. Forward thinking contact centers often try to optimize operations in real time using thresholds. This requires the contact center personnel to calculate the probability of meeting or exceeding the threshold, the potential consequences, the best course of action, and the response time. These are complex and potentially error prone calculations that are made on the fly by contact center staff.

There is thus a need for a contact center that can monitor performance relative to one or more selected KPIs.

SUMMARY

These and other needs are addressed by the various embodiments and configurations of the present invention. The invention is directed generally to a method and system for complying with service level agreements and KPIs.

In one embodiment, a contact center includes:
(a) work item queues;
(b) agent queues and/or agents servicing work items from the work item queues; and
(c) a real time threshold prediction module operable to:
  (C1) determine that a selected performance measure will, during a future time interval, likely cross a selected threshold;
  (C2) in response, perform at least one of the following operations:
    (i) determine a consequence (e.g., financial impact) of crossing the selected threshold; and
    (ii) determine a set of corrective actions to reduce a likelihood that the selected performance measure will cross the selected threshold.

The performance measure is commonly one or more of service level, expected wait time, predicted wait time, actual wait time, number of contacts waiting, percent abandons, average active during a call, average speed of answer, average hold time, percent of work items that are one and done, match rate, Percent Agent Disconnects First, Percent available, Percent Conferences, Percent Discussion from On Hold, Percent in Service Level, Percent Occupancy, Percent Redirects, Percent Transfers, Percent Transfers to Same Routing Point, Abandon Duration, Abandons, Abandons, Percent, Acceptables, Accepts, Active Duration, Active Duration, Average, Active Staffed Agents by Routing Point, Active Staffed Agents by Queue, Actives, Adherence to schedule, Adherence to procedures, Adjunct Attempts, Adjunct Redirects, Agent Occupancy, Agent State Duration, Agents Staffed, Agents in Aux. State, Agent Turnover rate, Alert Duration, Alert Duration, Average, Alerting Agents Staffed, Arrivals, Audio Difficulties, Auto Reserve Duration, Average Speed of Answer (ASA), Average Handle Time (AHT), Behind Target Duration, Behind Target Not Reserving Duration, Busies, Busies, Percent, Call Blockage, Cancels, Cancels, Percent, Conferences, Contacts at Agent, Contacts Finished Waiting, Contacts Waiting, Cost per contact (per media), Customer defection rate, Customer Satisfaction, Critical Duration, Curr. Max. Wait Duration, Dequeues, Direct Agent Contacts Waiting, Discussion from On Hold, Error or rework percentage or volume, Exp. Wait, First Call Resolution (First resolution rate), Handle Duration, Handle Duration, Average, Handles, Held Contacts, Idle Agents Staffed, Idle Duration, In Focus Hold Agents Staffed, In Focus Hold Duration, Inflows, Initiating Agents Staffed, Interflows, Initiate Duration, Interactions, Interactions at Agent, Max Delay in Queue (longest delay in queue), Net. Discussion, Net. in Duration, Net. Polls, Net. Redirects, Non-Working Aux. Agents Staffed, Non-Working Aux. Duration, Number of times a customer contacted the company, Occupied Duration, On Hold Agents Staffed, On Hold Contacts, On Hold Duration, On Target Duration, Out of Focus Hold Duration, Outflows, Outflows, Percent, Preview Agents Staffed, Preview Duration, Previews, Quality Monitoring Scores, Queue Duration, Redirects, Reserve Handles, Reserve Standby Agents Count, Returns, Service Level, Self Service Availability, Short Contacts, Short Seizures, Silence Duration, Staff Shrinkage (Shrinkage), State Duration, Staffed Duration, Successful Sales (number) or percentage, Successful upsell (number or percentage), Transfer Rate, Unknown Agents Staffed, Unknown Duration, Unoccupied Duration, Unstaffed Queue, Wait Duration, Working Aux. Agents Staffed, Working Aux. Duration, Wrap-up Agents Staffed, Wrap-up Duration, Wrap-up Duration, Average, and Wrap-ups and any other performance indicators known or later developed.

The consequence can be positive or negative to the contact center operator or client represented by the contact center. For example, the consequence may be a financial or business impact, monetary penalty, or other fee or charge.

In one configuration, the module:

determines, from substantially real-time contact center operating information and by a processor, a current value for the selected performance measure;

determines, from historic real-time contact center operating information, a set of historic values for the selected performance measure;

determines, by regression analysis, at least one of a mathematical function and a curve that approximately characterizes the historic and current values for the selected performance measure; and determines, based on the at least one of a mathematical function and curve, that the selected performance measure will cross the selected threshold and an estimate of when the selected performance measure will cross the threshold.

When the threshold has a high probability of cross over, it indicates that a KPI or other SLA target may be missed (or violated). A calculation can be performed to understand the priority of the threshold against previously administered enterprise SLA goals. If high priority contact center resources may need to be reallocated to correct the situation, additional processing will continue to determine the optimal solution for the contact center based on a variety of factors as predetermined by the enterprise. These could include, without limitation, reassignment of agents, diversion of traffic (or inbound or outbound contacts), call back of staff, etc. Resource reallocation can have a ripple effect on other KPIs and SLAs. Tradeoff solutions should be calculated to determine the optimal solution for the contact center. Once identified, the recommended option and time window would be presented to contact center administration, such as via a predetermined notification method, and/or be implemented automatically by the contact center.

The present invention can provide a number of advantages depending on the particular configuration. First, the invention can predict based on real time and/or near real time operational data when the threshold will be met or exceeded. Current solutions, by contrast, are limited to indicating the KPI relative to a threshold at the current time. Second, the invention can simplify the task of contact center operators in SLA compliance and provide recommended actions to administrators and supervisors well in advance of an SLA violation, thereby permitting administrators and supervisors to take corrective actions to reduce the likelihood that the violation will, in fact, occur. Current solutions, by contrast, rely on contact center administrators and supervisors analyzing the data and recommending actions. Due to the manual nature of the analysis, it may not be possible to react to the KPI versus threshold information quickly enough to make optimal cost-based decisions and trade-offs. Third, the invention can permit the contact center operator to operate under conditions that substantially maximize operating efficiency by operating at or near a given KPI with little deviation.

These and other advantages will be apparent from the disclosure of the invention(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

"Key Performance Indicator" refers to a contact center performance measure that is used by a service level agreement to set performance expectations, requirements, or specifications.

"Match rate" identifies how well contacts are being connected with agent's having the necessary skill set to fulfill the requests represented by the contact. Match rate is generally determined as the number of contacts connected to primary skill level agents divided by the total number of contacts assigned to agents over a predetermined amount of time. For example, if an agent and contact selector is forced to assign contacts to less than primary skill level agents, the match rate performance indicator decreases.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

"Service level" is generally user-specified and provides an indication of how efficiently incoming contacts are being answered by agents in the agent queues. In one configuration, service level is defined as the total number of contacts accepted (i.e., answered) by agents in the agent queue divided by the total number of contacts entering the contact queue over the same period of time.

"Service level agreement" refers to an agreement between a contact center operator and a client, such as a retailer, wholesaler, vendor, service provider, nonprofit institution, and the like, that sets forth key performance indicators and penalties for the failure of the performance indicators to comply with one or more specified threshold.

The term "switch" or "server" as used herein should be understood to include a PBX, an ACD, an enterprise switch, or other type of communications system switch or server, as well as other types of processor-based communication control devices such as media servers, computers, adjuncts, etc.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system having an ACD or other similar contact processing switch, the invention is not limited to any particular type of communication system switch or configuration of system elements. Those skilled in the art will recognize that the disclosed techniques may be used in any communication application in which it is desirable to provide improved contact processing.

Figure 1:
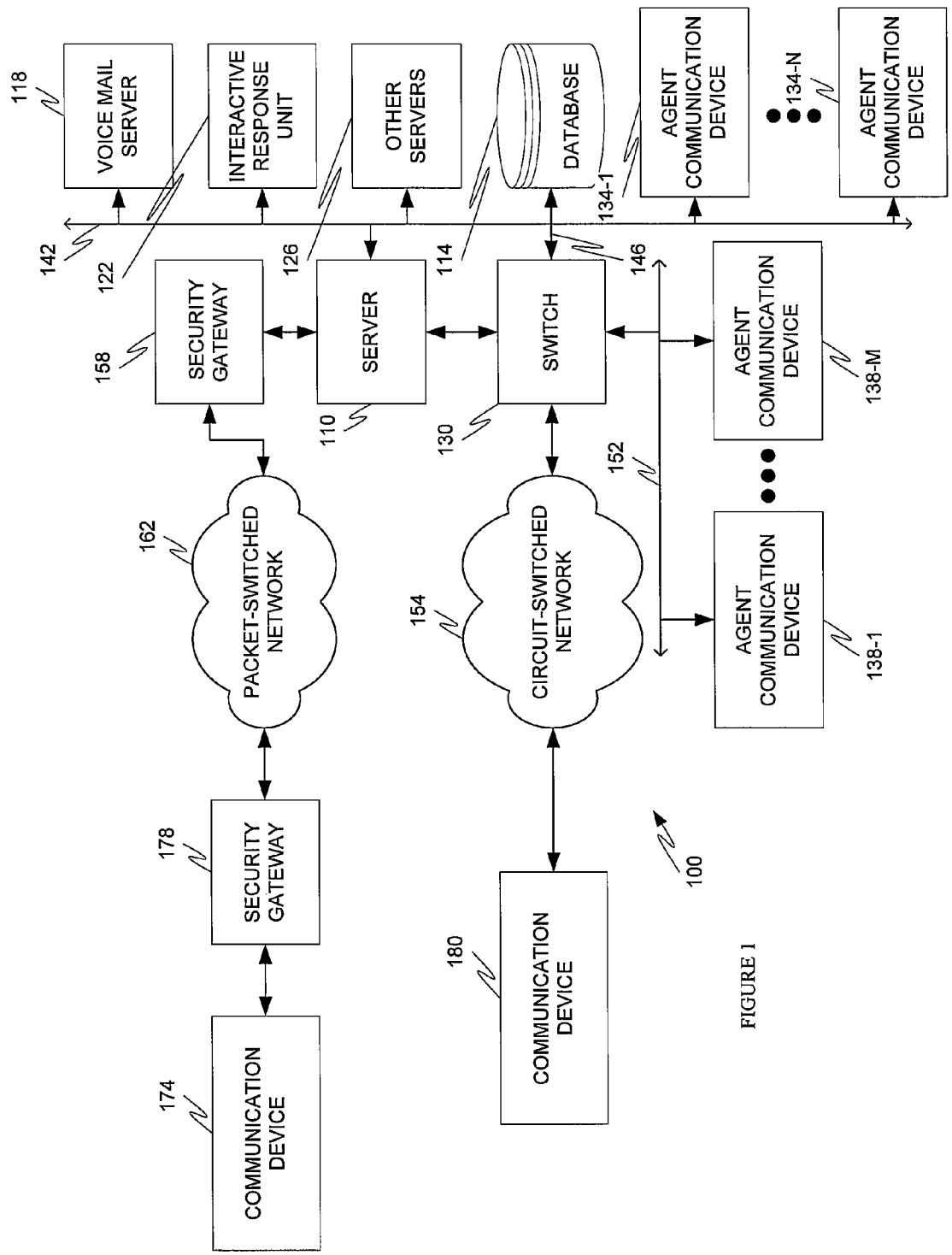
FIG. 1 is a block diagram depicting a contact center according to an embodiment of the present invention.

FIG. 1 shows an illustrative embodiment of the present invention. A contact center 100 comprises a central server 110, a set of data stores or databases 114 containing contact or customer related information and other information that can enhance the value and efficiency of the contact processing, and a plurality of servers, namely a voice mail server 118, an Interactive Response unit (e.g., IVR) 122, and other servers 126, a switch 130, a plurality of working agents operating packet-switched (first) communication devices 134-1 to N (such as computer work stations or personal computers), and/or circuit-switched (second) communication devices 138-1 to M, all interconnected by a local area network LAN (or wide area network WAN) 142. The servers can be connected via optional communication lines 146 to the switch 130. As will be appreciated, the other servers 126 can also include a scanner (which is normally not connected to the switch 130 or Web server), VoIP software, video call software, voice messaging software, an IP voice server, a fax server, a web server, an email server, and the like. The switch 130 is connected via a plurality of trunks 150 to the Public Switch Telephone Network or PSTN 154 and via link(s) 152 to the second communication devices 138-1 to M. A gateway 158 is positioned between the server 110 and the packet-switched network 162 to process communications passing between the server 110 and the network 162.

Although the preferred embodiment is discussed with reference to a client-server architecture, it is to be understood that the principles of the present invention apply to other network architectures. For example, the invention applies to peer-to-peer networks, such as those envisioned by the Session Initiation Protocol. In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Additionally, the invention does not require the presence of packet- or circuit-switched networks.

Figure 2:
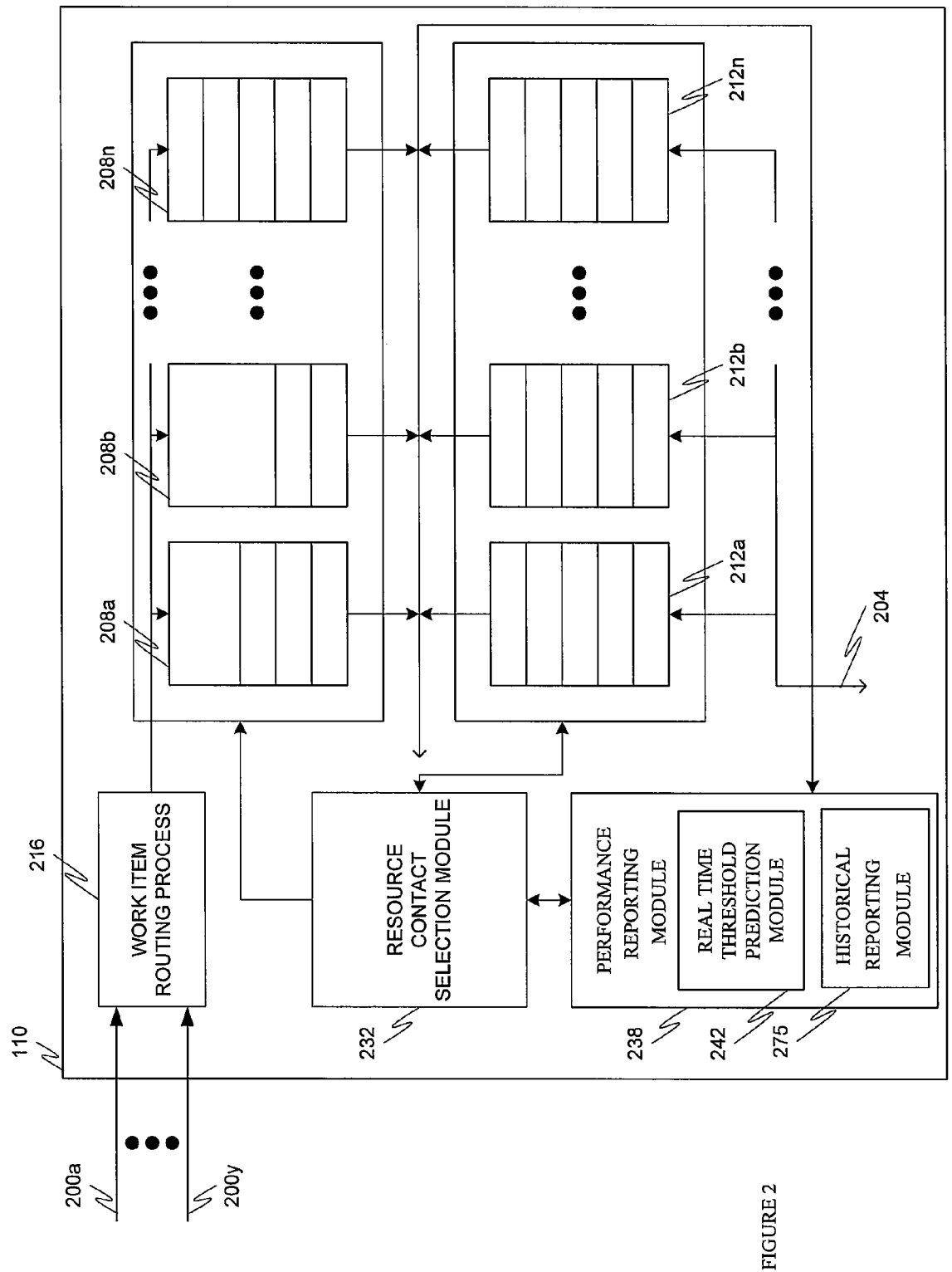
FIG. 2 is a block diagram of a server according to an embodiment of the present invention.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as LAN 142 and/or a circuit switched voice line). The server 110 can include a operational contact center reporting module (not shown), such as Avaya IQ™, CMS™, Basic Call Management System™, Operational Analyst™, and Customer Call Routing or CCR™ by Avaya, Inc., gathers call records and contact-center statistics for use in generating contact-center reports.

The switch 130 and/or server 110 can be any architecture for directing contacts to one or more communication devices. In some embodiments, the switch 130 may perform load-balancing functions by allocating incoming or outgoing contacts among a plurality of logically and/or geographically distinct contact centers. Illustratively, the switch and/or server can be a modified form of the subscriber-premises equipment sold by Avaya Inc. under the names Definity™ Private-Branch Exchange (PBX)-based ACD system, Multi-Vantage™ PBX, Communication Manager™, S8300™ media server and any other media servers, SIP Enabled Services™, Intelligent Presence Server™, and/or Avaya Interaction Center™, and any other products or solutions offered by Avaya or another company. Typically, the switch/server is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. Other types of known switches and servers are well known in the art and therefore not described in detail herein.

As can be seen in FIG. 2, included among the data stored in the server 110 is a set of contact queues 208a-n and a separate set of agent queues 212a-n. Each contact queue 208a-n corresponds to a different set of agent queues, as does each agent queue 212a-n. Conventionally, contacts are prioritized and either are enqueued in individual ones of the contact queues 208a-n in their order of priority or are enqueued in different ones of a plurality of contact queues that correspond to a different priority. Likewise, each agent's queues are prioritized according to his or her level of expertise or skill in that queue, and either agents are enqueued in individual ones of agent queues 212a-n in their order of expertise level or are enqueued in different ones of a plurality of agent queues 212a-n that correspond to a queue and each one of which corresponds to a different expertise level.

Included among the control programs in the server 110 is a work item routing processwork item routing process 216. Contacts incoming to the contact center are assigned by work item routing process 216 to different contact queues 208a-n based upon a number of predetermined criteria, including customer identity, customer needs, contact center needs, current contact center queue lengths, customer value, and the agent skill that is required for the proper handling of the contact. Agents who are available for handling contacts are assigned to agent queues 212a-n based upon the skills that they possess. An agent may have multiple skills, and hence may be assigned to multiple agent queues 212a-n simultaneously. Furthermore, an agent may have different levels of skill expertise (e.g., skill levels 1-N in one configuration or merely primary skill levels and secondary skill levels in another configuration), and hence may be assigned to different agent queues 212a-n at different expertise levels.

In one configuration, the contact center is operated by a contract operator, and each of the contact queues 208a-n, and possibly each of the agent queues 212a-n, corresponds to a different client. Each client can have a separate service level agreement or other type of performance measurement agreement with the contract operator regarding performance expectations, goals, requirements or specifications for the client's respective queue(s). The service level agreement can set forth penalties, such as financial penalties, for failing to comply with the service level agreement's requirements.

Referring again to FIG. 1, the gateway 158 can be Avaya Inc.'s, G700 Media Gateway™ and may be implemented as hardware such as via an adjunct processor (as shown) or as a chip in the server.

The first communication devices 134-1, . . . 134-N are packet-switched and can include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, peer-to-peer based communication devices, and any other communication device.

The second communication devices 138-1, . . . 138-M are circuit-switched. Each of the communication devices 138-1, . . . 138-M corresponds to one of a set of internal extensions Ext1, . . . ExtM, respectively. The second communication devices can include, for example, wired and wireless telephones, PDAs, H.320 videophones and conferencing units, voice messaging and response units, traditional computer telephony adjuncts, and any other communication device.

It should be noted that the invention does not require any particular type of information transport medium between switch or server and first and second communication devices, i.e., the invention may be implemented with any desired type of transport medium as well as combinations of different types of transport channels.

The packet-switched network 162 can be any data and/or distributed processing network, such as the Internet. The network 162 typically includes proxies (not shown), registrars (not shown), and routers (not shown) for managing packet flows.

The packet-switched network 162 is in communication with a first communication device 174 via a gateway 178, and the circuit-switched network 154 with an external second communication device 180.

In a preferred configuration, the server 110, network 162, and first communication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user communication devices, and other elements as shown in FIG. 1 is for purposes of illustration only and should not be construed as limiting the invention to any particular arrangement of elements.

According to at least one embodiment, a resource contact selection resource contact selection module 232 and performance reporting module 238 are provided. The resource contact selection module 232 and performance reporting module 238 are stored either in the main memory or in a peripheral memory (e.g., disk, CD ROM, etc.) or some other computer-readable medium of the center 100.

The resource contact selection module 232 monitors the occupants of the work item and agent queues 208a-n and 212a-n, respectively, and contact center objectives, rules, and policies and assigns agents to service work items. As will be appreciated, the central server 110 is notified via LAN 142 of an incoming contact by the communications component (e.g., switch 130, fax server, email server, web server, and/or other server) receiving the incoming contact. The incoming contact is held by the receiving communications component until the resource contact selection module 232 forwards instructions to the component to forward or route the contact to a specific contact center resource, such as the interactive response unit 122, the voice mail server 118, and/or first or second communication device 134, 138 associated with a selected agent. The module 232 distributes and connects these contacts to communication devices of available agents based on the predetermined criteria noted above. When the module 232 forwards a voice contact to an agent, the c module 232 also forwards customer-related information from databases 114 to the agent's computer work station for previewing and/or viewing (such as by a pop-up display) to permit the agent to better serve the customer. The agents process the contacts sent to them by the module 232.

The performance reporting module 238 receives contact center operational information (such as from historical reporting model 275), analyzes the information, and provides the results to contact center administrators. The performance reporting module 238 includes a real time threshold prediction module 242 that, based upon real time operational information, predicts if and when a performance measure for a work item queue will cross a threshold, determines the penalty (e.g., financial impact) for crossing the threshold and/or provides a set of recommendations or corrective actions to avoid violating the threshold and/or reduce the penalty associated with threshold violation. The performance reporting module may be incorporated into the operational contact center reporting module (not shown).

Figure 3A:
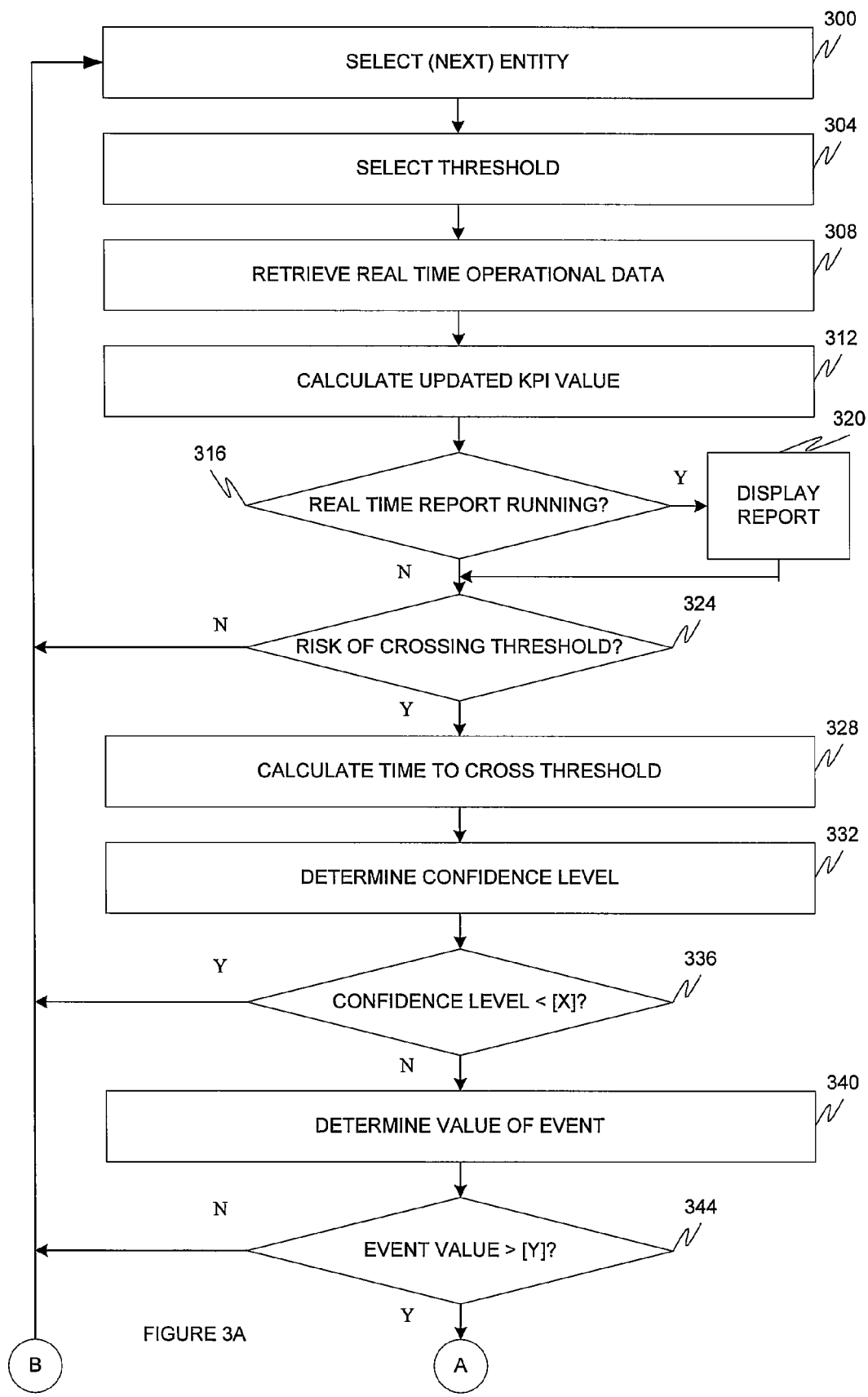
FIGS. 3A and 3B are collectively a flowchart depicting an embodiment of the invention.
Figure 3B:
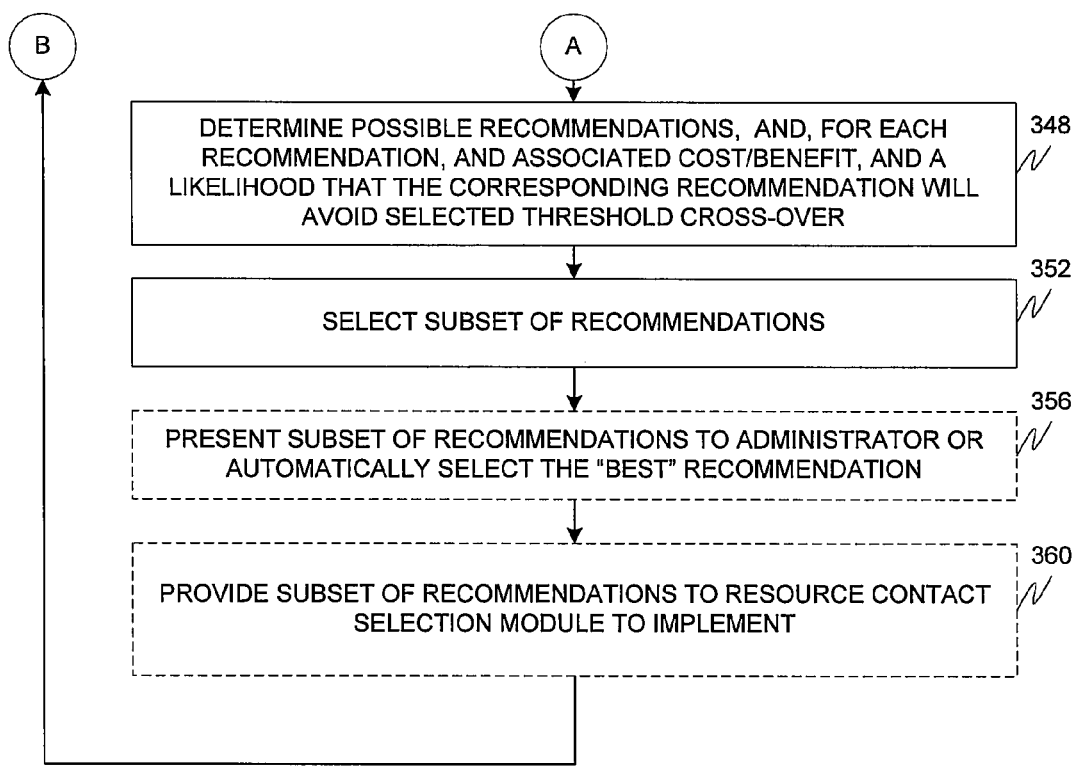

The operation of the performance reporting module 258 will now be discussed with reference to FIGS. 3A and 3B.

In step 300, the real time threshold prediction module 242 selects a next entity for analysis. The entity is a contact center performance measure, or a Key Performance Indicator ("KPI"), which is linked to a financial consequence in a Service Level Agreement ("SLA") between the contact center operator and a third party company, such as a vendor, service provider, manufacturer, retailer, supplier, or wholesaler. The SLA sets one or more thresholds for the KPI and, for each threshold, defines a consequence, typically a monetary penalty, in the event that the KPI crosses the threshold absolutely or for the duration of a defined time interval. Examples of KPI's include performance measures such as service level, expected wait time, predicted wait time, actual wait time, number of contacts waiting, percent abandons, average active during a call, average speed of answer, average hold time, percent of work items that are one and done, match rate, Percent Agent Disconnects First, Percent available, Percent Conferences, Percent Discussion from On Hold, Percent in Service Level, Percent Occupancy, Percent Redirects, Percent Transfers, Percent Transfers to Same Routing Point, Abandon Duration, Abandons, Abandons, Percent, Acceptables, Accepts, Active Duration, Active Duration, Average, Active Staffed Agents by Routing Point, Active Staffed Agents by Queue, Actives, Adherence to schedule, Adherence to procedures, Adjunct Attempts, Adjunct Redirects, Agent Occupancy, Agent State Duration, Agents Staffed, Agents in Aux. State, Agent Turnover rate, Alert Duration, Alert Duration, Average, Alerting Agents Staffed, Arrivals, Audio Difficulties, Auto Reserve Duration, Average Speed of Answer (ASA), Average Handle Time (AHT), Behind Target Duration, Behind Target Not Reserving Duration, Busies, Busies, Percent, Call Blockage, Cancels, Cancels, Percent, Conferences, Contacts at Agent, Contacts Finished Waiting, Contacts Waiting, Cost per contact (per media), Customer defection rate, Customer Satisfaction, Critical Duration, Curr. Max. Wait Duration, Dequeues, Direct Agent Contacts Waiting, Discussion from On Hold, Error or rework percentage or volume, Exp. Wait, First Call Resolution (First resolution rate), Handle Duration, Handle Duration, Average, Handles, Held Contacts, Idle Agents Staffed, Idle Duration, In Focus Hold Agents Staffed, In Focus Hold Duration, Inflows, Initiating Agents Staffed, Interflows, Initiate Duration, Interactions, Interactions at Agent, Max Delay in Queue (longest delay in queue), Net. Discussion, Net. in Duration, Net. Polls, Net. Redirects, Non-Working Aux. Agents Staffed, Non-Working Aux. Duration, Number of times a customer contacted the company, Occupied Duration, On Hold Agents Staffed, On Hold Contacts, On Hold Duration, On Target Duration, Out of Focus Hold Duration, Outflows, Outflows, Percent, Preview Agents Staffed, Preview Duration, Previews, Quality Monitoring Scores, Queue Duration, Redirects, Reserve Handles, Reserve Standby Agents Count, Returns, Service Level, Self Service Availability, Short Contacts, Short Seizures, Silence Duration, Staff Shrinkage (Shrinkage), State Duration, Staffed Duration, Successful Sales (number) or percentage, Successful upsell (number or percentage), Transfer Rate, Unknown Agents Staffed, Unknown Duration, Unoccupied Duration, Unstaffed Queue, Wait Duration, Working Aux. Agents Staffed, Working Aux. Duration, Wrap-up Agents Staffed, Wrap-up Duration, Wrap-up Duration, Average, and Wrap-ups, any other performance indicators known or later developed, and any combinations thereof.

In step 304, the module 242 selects one or more thresholds for the selected KPI. The threshold is typically for a selected client and work item queue. Alternatively, the module 242 may select sets of thresholds for different clients and/or for different work item queues.

In step 308, the module 242 retrieves, for the selected KPI, real time operational data from the operational contact center reporting module. The operational data generally includes not only historic KPI values but also current (real time) operational data for the contact center. The current operational data is determined by a real time event processing module of the operational contact center reporting module.

In step 312, the module 242 determines, from the current operational data, the current, or updated, value for the KPI. The KPI value is determined by known techniques.

In decision diamond 316, the module 242 determines whether a real time report is running. When the report is running, the module 242, in step 320, displays a report to contact center administration. The report includes a notification of where the updated KPI is relative to the selected threshold. This may be displayed by a distinctive foreground or background color of a selected set of fields, an audible sound, or other indicator.

When the report is not running or after step 320, the module 242, in decision diamond 324, determines a risk of crossing the selected threshold and, in step 328, the time for the selected KPI to cross the selected threshold. The module makes at least two predictions, namely does the module 242 predict that the selected KPI will cross the threshold within a predetermined time period? and, if so, what is the estimated time at or before which the selected KPI will cross the threshold? These questions can be answered applying known mathematical algorithms to the contact center operational data. In one configuration, the values for the KPI as a function of time are determined for a specified time period. A curve-fitting mathematical technique, particularly interpolation or regression analysis, is applied to arrive at an algorithm that defines a "best fit" for the KPI values over the time period. As will be appreciated, "regression analysis" refers to techniques for modeling and analyzing numerical data including values of a dependent variable (also called response variable or measurement) and of one or more independent variables (also known as explanatory variables or predictors). The dependent variable in the regression equation is modeled as a function of the independent variables, corresponding parameters ("constants"), and an error term. The parameters are estimated so as to give a "best fit" of the data. Most commonly the best fit is evaluated using the least squares method, but other criteria have also been used. For example, linear regression techniques can be applied to the KPI value set to yield an algorithm defining a straight line.

Once a "best fit" algorithm is determined, the algorithm may be extrapolated to determine whether the KPI will likely reach the threshold and, if so, when the KPI and threshold will match. By way of illustration, if the "best fit" algorithm is a straight line the slope of the straight line can indicate the trend of the KPI as a function of time, e.g., when and if the KPI will cross the threshold. If the line slopes away from the threshold, there is no danger, at present, of the KPI crossing the threshold. If the line slopes towards the threshold, there is a danger of the KPI crossing the threshold. Under the equation $Y=mX+B$, where m is the slope and X is time, B is the Y axis intercept, and Y is the KPI value, the time before the threshold is crossed, or X, is determined by setting Y equal to the threshold value and solving for X.

Additionally, the module 242, in step 332, may determine a level of confidence or confidence interval that the algorithm correct characterizes the KPI values, that the KPI will cross the selected threshold, and/or that the selected threshold crossing time is accurate. The module 242 may determine the confidence level or interval using any suitable technique, such as sample statistics, likelihood theory, equation estimating, and significance testing. The confidence level may also be determined using correlation to produce a correlation coefficient. A correlation coefficient indicates the strength and direction of a linear relationship between two random variables. Accordingly, the correlation coefficient is a type of confidence indicator. Generally, the closeness of the KPI to the selected threshold is directly proportional to the confidence level and to the degree to which the algorithm fits the KPI values.

Returning to decision diamond 324, when the module 242 determines that there is no risk of the selected KPI crossing the selected threshold the module returns to and repeats step 300 with respect to a next entity. When the module 242 determines that there is a risk of the selected KPI crossing the selected threshold, the module 242 proceeds to steps 328 and 332.

After step 332, the module 242, in decision diamond 336, determines whether the confidence level is less than a selected value "[X]". When the level of confidence is too low, it indicates that the module 242 is, statistically, not able to determine with any degree of accuracy one or more of the following: (i) that the algorithm correctly characterizes the KPI values, (ii) that the KPI will cross the selected threshold, and/or (iii) that the selected threshold crossing time is accurate. In such situations, the administrator and/or client has determined that the risk of crossing the selected threshold can not be determined to a statistical degree of accuracy. Accordingly, the module 242 returns to and repeats step 300.

When the confidence level is equal to or greater than "[X]", the module 242, in step 340, assigns a value to the event. The value of the event may be determined in many ways. For example, the event value may be based on a monetary penalty set forth in the SLA for the KPI crossing the selected threshold. The event value may be a function of the level of importance or value, to the contact center operator, of the client corresponding to the KPI. The event value may be a function of the identity of the contactor associated with a work item. The contactor may, for instance, be a silver, gold, or bronze customer. The value of the event may be a function of the estimated time to crossing of the selected threshold. For shorter crossing times, the event value is greater than for longer crossing times.

In decision diamond 344, the module 242 determines whether the event value is greater than a selected value "[Y]". Like the selected thresholds and confidence level, this value generally is client-specific and varies client-by-client. It is a level of significance of the event. Lower event values are not deemed to be significant and are ignored. When the event value is less than "[Y]", the module 242 returns to and repeats step 300. When the event value is equal to or greater than "[Y]", the module 242 proceeds to step 348 (FIG. 3B).

In step 348, the module 242 determines the set of possible recommendations, a cost/benefit of each recommendation, and when each recommendation will work. The recommendations are commonly determined by a set of rules or policies. In one application, a set of templates is used. When the facts surrounding the event fit substantially a template, a recommendation corresponding to that template is selected. In one application, an intelligent module, such as an intelligent agent or cognitive architecture (e.g., a neural network, fuzzy logic, first-order logic, and default logics), is used to observe the actions of contact center administration and, based on the actions, develop a set of templates and matching recommendations.

The cost/benefit and likelihood of success of each recommendation can be determined in a number of ways. For example, one recommendation is to reassign one agent from a first agent queue 212a to a second agent queue 212b to prevent a KPI associated with the second agent queue 212b from passing a selected threshold. For that recommendation, the module 242 determines a likelihood that reassigning the agent to the second agent queue will prevent threshold cross over. The module 242 also determines, for that recommendation, whether reassigning the agent will cause a KPI for the first agent queue 212a to cross over a selected threshold for the client associated with that queue. If the answer is "yes", the module 242 determines, for the recommendation, a corresponding net financial penalty or benefit set forth in the SLA with the other client for the threshold cross-over. The operator may be paid a bonus from a first client for avoiding a selected threshold cross-over for a first work item queue and be charged a penalty by a second client for permitting a selected threshold cross-over to occur with respect to a second work item queue. The cost or benefit is the net of these two amounts, possibly with the amounts being adjusted by the probability that the benefit or penalty will occur. Specifically, the penalty or benefit is multiplied by the probability that it will occur in response to the recommendation to provide the cost/benefit of implementing the recommendation. Such an analysis is undertaken for each possible recommendation. Exemplary recommendations include reassigning one or more agents from one work item queue to another work item queue, putting work items out for bid to external agents, move work items to another queue, calling agents back from their breaks, delaying agent breaks, paying agents overtime to service the work item queue in jeopardy, using an off-site standby agent, assigning a reserve or standby agent to the queue in jeopardy, switch work items to a different contact center, send items to any self-service application, and combinations thereof.

In step 352, the module 242 applies rules and policies and selects a subset of the recommendations for presentation to an administrator. The rules and policies may be qualitative and/or quantitative.

In optional step 356, the module 242 presents the subset of recommendations to an administrator or automatically selects the "best" recommendation.

In optional step 360, the module 242 provides the subset of recommendations to the work item routing process 216 and/or resource contact selection module 232 for implementation. The routing vector settings would be adjusted based on the recommendation(s).

Alternatively or additionally, the recommendation may be provided to the interactive response unit 122 to adjust the unit's settings.

An example will now be discussed to illustrate the above principles. A contact center has first and second clients. Both have service level agreements having the Average Speed of Answer ("ASA") as a KPI. The first client will fine the contact center $20,000 if the ASA exceeds ten seconds. The second client will fine the contact center $5,000 if the ASA exceeds 25 seconds. The first client uses the first queue, and the second client the second queue. Both the first and second queues have implemented real time prediction thresholds.

The threshold exception is calculated from the current real time operational information. Threshold growth rate is calculated from the number of calls in queue for the threshold. Current threshold processing rate is calculated from the current average agent handle time, the number of agents staffed, and the abandon rate. Based on the incoming threshold growth rate and the threshold processing rate, it is estimated that the first queue will exceed its KPI of 10 second ASA in three minutes and face a $20,000 penalty.

The potential option is to add agents to the first queue. The first queue's agents are a shared resource with the second queue. A tradeoff calculation is made to determine the impact of removing agents from the second queue and moving them to the first queue. The contact center has previously determined that its tradeoff calculations should use the lowest SLA penalty as a deciding factor. The tradeoff calculations determine that the second queue would also exceed its SLA; however, the second queue penalty for exceeding the threshold is only $5,000. Therefore, the recommendation to contact center administration is to move agents from the second queue to the first queue.

The potential option has a time window associated with it. If agents from the second queue are not moved to the first queue soon enough, the desired outcome can not be realized.

The contact center is notified, by the module 242, of the situation via a previously identified method, namely a high priority email sent to the appropriate staff. The email identifies the situation (three minutes until a potential first queue SLA violation and penalty of $20,000), the recommended action (move a specified number of agents to the first queue from the second queue) and the consequence (a potential second queue SLA violation and penalty of $5,000).

The contact center makes the associated agent staffing change.

The exemplary systems and methods of this invention have been described in relation to a contact center. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

For example in one alternative embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. In a contact center comprising a plurality of agents servicing work items from a plurality of work item queues, a method comprising:
   (a) determining, by a processor, that a selected performance measure will, during a future time interval, likely cross a selected threshold; and
   (b) in response, performing, by the processor, at least one of the following steps:
      (B1) determining a financial impact of crossing the selected threshold; and
      (B2) determining a set of correction actions to reduce a likelihood that the selected performance measure will cross the selected threshold.

2. The method of claim 1, wherein the performance measure is one or more of service level, expected wait time, predicted wait time, actual wait time, number of contacts waiting, percent abandons, average active during a call, average speed of answer, average hold time, percent of work items that are one and done, match rate, Percent Agent Disconnects First, Percent available, Percent Conferences, Percent Discussion from On Hold, Percent in Service Level, Percent Occupancy, Percent Redirects, Percent Transfers, Percent Transfers to Same Routing Point, Abandon Duration, Abandons, Abandons Percent, Acceptables, Accepts, Active Duration, Active Duration, Average, Active Staffed Agents by Routing Point, Active Staffed Agents by Queue, Actives, Adherence to schedule, Adherence to procedures, Adjunct Attempts, Adjunct Redirects, Agent Occupancy, Agent State Duration, Agents Staffed, Agents in Aux. State, Agent Turnover rate, Alert Duration, Alert Duration Average, Alerting Agents Staffed, Arrivals, Audio Difficulties, Auto Reserve Duration, Average Speed of Answer (ASA), Average Handle Time (AHT), Behind Target Duration, Behind Target Not Reserving Duration, Busies, Busies Percent, Call Blockage, Cancels, Cancels Percent, Conferences, Contacts at Agent, Contacts Finished Waiting, Contacts Waiting, Cost per contact (per media), Customer defection rate, Customer Satisfaction, Critical Duration, Curr. Max. Wait Duration, Dequeues, Direct Agent Contacts Waiting, Discussion from On Hold, Error or rework percentage or volume, Exp. Wait, First Call Resolution (First resolution rate), Handle Duration, Handle Duration Average, Handles, Held Contacts, Idle Agents Staffed, Idle Duration, In Focus Hold Agents Staffed, In Focus Hold Duration, Inflows, Initiating Agents Staffed, Interflows, Initiate Duration, Interactions, Interactions at Agent, Max Delay in Queue (longest delay in queue), Net. Discussion, Net, in Duration, Net. Polls, Net. Redirects, Non-Working Aux. Agents Staffed, Non-Working Aux. Duration, Number of times a customer contacted the company, Occupied Duration, On Hold Agents Staffed, On Hold Contacts, On Hold Duration, On Target Duration, Out of Focus Hold Duration, Outflows, Outflows, Percent, Preview Agents Staffed, Preview Duration, Previews, Quality Monitoring Scores, Queue Duration, Redirects, Reserve Handles, Reserve Standby Agents Count, Returns, Service Level, Self Service Availability, Short Contacts, Short Seizures, Silence Duration, Staff Shrinkage (Shrinkage), State Duration, Staffed Duration, Successful Sales (number) or percentage, Successful upsell (number or percentage), Transfer Rate, Unknown Agents Staffed, Unknown Duration, Unoccupied Duration, Unstaffed Queue, Wait Duration, Working Aux. Agents Staffed, Working Aux. Duration, Wrap-up Agents Staffed, Wrap-up Duration, Wrap-up Duration Average, and Wrap-ups, and any other performance indicators known or later developed.

3. The method of claim 1, wherein step (a) comprises:
(A1) determining, from substantially real-time contact center operating information and by the processor, a current value for the selected performance measure;
(A2) determining, from historic contact center operating information and by the processor, a set of historic values for the selected performance measure;
(A3) determining, by regression analysis and by the processor, at least one of a mathematical function and a curve that approximately characterizes the historic and current values for the selected performance measure; and
(A4) determining, by a processor and based on the at least one of a mathematical function and curve, that the selected performance measure will cross the selected threshold and an estimate of when the selected performance measure will cross the selected threshold.

4. The method of claim 3, further comprising:
(c) determining, by the processor, one or more levels of confidence that at least one of a mathematical function and curve correctly characterizes the historic and current selected performance measure values, that the selected performance threshold will cross the selected threshold, and/or that the estimate of when the selected performance measure is/are correct.

5. The method of claim 3, wherein (B1) is performed and further comprising:
(d) determining that the one or more levels of confidence indicates that a threshold crossing is likely; and
(e) in response to step (d), assigning a value to the threshold crossing event, wherein the value is a function of a penalty under a service level agreement between a contact center operator and a client.

6. The method of claim 4, wherein step (B2) is performed and further comprising:
(d) determining that the event value is greater than a selected value; and
(g) in response to step (d), determining a set of recommendations to reduce a likelihood that the threshold crossing event will occur.

7. The method of claim 5, wherein each recommendation in the set of recommendations has a corresponding at least one of a cost and benefit and a likelihood of success.

8. A non-transitory computer readable medium comprising processor executable instructions to perform the steps of claim 1.

9. A contact center, comprising:
(a) a plurality of work item queues;
(b) a plurality of agents servicing work items from the plurality of work item queues; and:
(c) a real time threshold prediction module operable to:
(C1) determine that a selected performance measure will, during a future time interval, likely cross a selected threshold;
(C2) in response, perform at least one of the following operations:
(i) determine a consequence of crossing the selected threshold; and
(ii) determine a set of corrective actions to reduce a likelihood that the selected performance measure will cross the selected threshold.

10. The contact center of claim 9, wherein the performance measure is one or more of service level, expected wait time, predicted wait time, actual wait time, number of contacts waiting, percent abandons, average active during a call, average speed of answer, average hold time, percent of work items that are one and done, match rate, Percent Agent Disconnects First, Percent available, Percent Conferences, Percent Discussion from On Hold, Percent in Service Level, Percent Occupancy, Percent Redirects, Percent Transfers, Percent Transfers to Same Routing Point, Abandon Duration, Abandons, Abandons Percent, Acceptables, Accepts, Active Duration, Active Duration Average, Active Staffed Agents by Routing Point, Active Staffed Agents by Queue, Actives, Adherence to schedule, Adherence to procedures, Adjunct Attempts, Adjunct Redirects, Agent Occupancy, Agent State Duration, Agents Staffed, Agents in Aux. State, Agent Turnover rate, Alert Duration, Alert Duration Average, Alerting Agents Staffed, Arrivals, Audio Difficulties, Auto Reserve Duration, Average Speed of Answer (ASA), Average Handle Time (AHT), Behind Target Duration, Behind Target Not Reserving Duration, Busies, Busies Percent, Call Blockage, Cancels, Cancels Percent, Conferences, Contacts at Agent, Contacts Finished Waiting, Contacts Waiting, Cost per contact (per media), Customer defection rate, Customer Satisfaction, Critical Duration, Curr. Max. Wait Duration, Dequeues, Direct Agent Contacts Waiting, Discussion from On Hold, Error or rework percentage or volume, Exp. Wait, First Call Resolution (First resolution rate), Handle Duration, Handle Duration, Average, Handles, Held Contacts, Idle Agents Staffed, Idle Duration, In Focus Hold Agents Staffed, In Focus Hold Duration, Inflows, Initiating Agents Staffed, Interflows, Initiate Duration, Interactions, Interactions at Agent, Max Delay in Queue (longest delay in queue), Net. Discussion, Net, in Duration, Net. Polls, Net. Redirects, Non-Working Aux. Agents Staffed, Non-Working Aux. Duration, Number of times a customer contacted the company, Occupied Duration, On Hold Agents Staffed, On Hold Contacts, On Hold Duration, On Target Duration, Out of Focus Hold Duration, Outflows, Outflows, Percent, Preview Agents Staffed, Preview Duration, Previews, Quality Monitoring Scores, Queue Duration, Redirects, Reserve Handles, Reserve Standby Agents Count, Returns, Service Level, Self Service Availability, Short Contacts, Short Seizures, Silence Duration, Staff Shrinkage (Shrinkage), State Duration, Staffed Duration, Successful Sales (number) or percentage, Successful upsell (number or percentage), Transfer Rate, Unknown Agents Staffed, Unknown Duration, Unoccupied Duration, Unstaffed Queue, Wait Duration, Working Aux.

Agents Staffed, Working Aux. Duration, Wrap-up Agents Staffed, Wrap-up Duration, Wrap-up Duration Average, and Wrap-ups.

11. The contact center of claim 9, wherein operation (C1) comprises the sub-operations:
determine, from substantially real-time contact center operating information and by a processor, a current value for the selected performance measure;
determine, from historic contact center operating information, a set of historic values for the selected performance measure;
determine, by regression analysis, at least one of a mathematical function and a curve that approximately characterizes the historic and current values for the selected performance measure; and
determine, based on the at least one of a mathematical function and curve, that the selected performance measure will cross the selected threshold and an estimate of when the selected performance measure will cross selected the threshold.

12. The contact center of claim 11, wherein the real time prediction module (C3) determines one or more levels of confidence that the at least one of a mathematical function and curve correctly characterizes the historic and current selected performance measure values, that the selected performance threshold will cross the threshold, and/or that the estimate of when the selected performance measure is/are correct.

13. The contact center of claim 12, wherein the consequence is a financial impact and wherein the real time prediction module performs (i) the further operations:
(C4) determining that the one or more levels of confidence indicates that a threshold crossing is likely; and
(C5) in response to operation (C4), assigning a value to the threshold crossing event, wherein the value is a function of a penalty under a service level agreement between a contact center operator and a client.

14. The contact center of claim 13, wherein the real time prediction module performs operation (ii) and the further operations:
(C6) determining that the event value is greater than a selected value; and
(C7) in response to step (C6), determining a set of recommendations to reduce a likelihood that the threshold crossing event will occur.

15. The contact center of claim 14, wherein each recommendation in the set of recommendations has a corresponding at least one of a cost and benefit and a likelihood of success.

16. A contact center, comprising:
(a) a plurality of work item queues;
(b) a plurality of agent queues for servicing work items from the plurality of work item queues, wherein a first work item queue corresponds to a first client having a first service level agreement or any other performance measurement agreement with an operator of the contact center and a second work item queue corresponds to a second client having a second service level agreement or any other performance measurement agreement with the contact center operator, wherein the first and second service level or any other performance measurement agreement agreements set forth one or more performance thresholds and, for each such performance threshold, a consequence in the event that a performance indicator crosses the performance threshold; and:
I a real time threshold prediction module operable to:
(C1) determine that a selected performance measure will, during a future time interval, likely cross a selected performance threshold; and
(C2) in response, perform at least one of the following operations:
(i) determine, for the likely crossing of the selected performance threshold, a financial penalty in a selected service level agreement or any other performance measurement agreement; and
(ii) determine a set of corrective actions to reduce a likelihood that the selected performance measure will cross the selected threshold.

17. The contact center of claim 16, wherein the performance measure is one or more of service level or any other performance measurement agreement, expected wait time, predicted wait time, actual wait time, number of contacts waiting, percent abandons, average active during a call, average speed of answer, average hold time, percent of work items that are one and done, match rate, Percent Agent Disconnects First, Percent available, Percent Conferences, Percent Discussion from On Hold, Percent in Service Level, Percent Occupancy, Percent Redirects, Percent Transfers, Percent Transfers to Same Routing Point, Abandon Duration, Abandons, Abandons Percent, Acceptables, Accepts, Active Duration, Active Duration Average, Active Staffed Agents by Routing Point, Active Staffed Agents by Queue, Actives, Adherence to schedule, Adherence to procedures, Adjunct Attempts, Adjunct Redirects, Agent Occupancy, Agent State Duration, Agents Staffed, Agents in Aux. State, Agent Turnover rate, Alert Duration, Alert Duration Average, Alerting Agents Staffed, Arrivals, Audio Difficulties, Auto Reserve Duration, Average Speed of Answer (ASA), Average Handle Time (AHT), Behind Target Duration, Behind Target Not Reserving Duration, Busies, Busies Percent, Call Blockage, Cancels, Cancels Percent, Conferences, Contacts at Agent, Contacts Finished Waiting, Contacts Waiting, Cost per contact (per media), Customer defection rate, Customer Satisfaction, Critical Duration, Curr. Max. Wait Duration, Dequeues, Direct Agent Contacts Waiting, Discussion from On Hold, Error or rework percentage or volume, Exp. Wait, First Call Resolution (First resolution rate), Handle Duration, Handle Duration Average, Handles, Held Contacts, Idle Agents Staffed, Idle Duration, In Focus Hold Agents Staffed, In Focus Hold Duration, Inflows, Initiating Agents Staffed, Interflows, Initiate Duration, Interactions, Interactions at Agent, Max Delay in Queue (longest delay in queue), Net. Discussion, Net, in Duration, Net. Polls, Net. Redirects, Non-Working Aux. Agents Staffed, Non-Working Aux. Duration, Number of times a customer contacted the company, Occupied Duration, On Hold Agents Staffed, On Hold Contacts, On Hold Duration, On Target Duration, Out of Focus Hold Duration, Outflows, Outflows, Percent, Preview Agents Staffed, Preview Duration, Previews, Quality Monitoring Scores, Queue Duration, Redirects, Reserve Handles, Reserve Standby Agents Count, Returns, Service Level, Self Service Availability, Short Contacts, Short Seizures, Silence Duration, Staff Shrinkage (Shrinkage), State Duration, Staffed Duration, Successful Sales (number) or percentage, Successful upsell (number or percentage), Transfer Rate, Unknown Agents Staffed, Unknown Duration, Unoccupied Duration, Unstaffed Queue, Wait Duration, Working Aux. Agents Staffed, Working Aux. Duration, Wrap-up Agents Staffed, Wrap-up Duration, Wrap-up Duration Average, and Wrap-ups.

18. The contact center of claim 16, wherein operation (C1) comprises the sub-operations:
determine, from substantially real-time contact center operating information and by a processor, a current value for the selected performance measure;

determine, from historic real-time contact center operating information, a set of historic values for the selected performance measure;

determine, by regression analysis, at least one of a mathematical function and a curve that approximately characterizes the historic and current values for the selected performance measure; and determine, based on the at least one of a mathematical function and curve, that the selected performance measure will cross the selected threshold and an estimate of when the selected performance measure will cross the threshold and wherein the real time prediction module (C3) determines one or more levels of confidence that the at least one of a mathematical function and curve correctly characterizes the historic and current selected performance measure values, that the selected performance threshold will cross the threshold, and/or that the estimate of when the selected performance measure is/are correct.

19. The contact center of claim 18, wherein the real time prediction module performs (i) and the further operations:

(C4) determining that the one or more levels of confidence indicates that a threshold crossing is likely; and (C5) in response to operation (C4), assigning a value to the threshold crossing event, wherein the value is a function of a penalty under a service level agreement between a contact center operator and a client.

20. The contact center of claim 19, wherein step (ii) is performed and further comprising:

(f) determining that the event value is greater than a selected value; and (g) in response to step (f), determining a set of recommendations to reduce a likelihood that the threshold crossing event will occur and wherein each recommendation in the set of recommendations has a corresponding at least one of a cost and benefit and a likelihood of success.

* * * * *

UNITED STATES PATENT AND TRADEMARK OFFICE
CERTIFICATE OF CORRECTION

PATENT NO.       : 8,175,254 B2
APPLICATION NO.  : 12/429032
DATED            : May 8, 2012
INVENTOR(S)      : Li et al.

It is certified that error appears in the above-identified patent and that said Letters Patent is hereby corrected as shown below:

In the Claims:

At Column 17, in Claim 2, line 6, please change "Discussion, Net," to --Discussion, Net.-- therein.

At Column 18, in Claim 10, line 53, please change "Discussion, Net," to --Discussion, Net.-- therein.

At Column 20, in Claim 17, line 45, please change "Discussion, Net," to --Discussion, Net.-- therein.

Signed and Sealed this
First Day of January, 2013

David J. Kappos
*Director of the United States Patent and Trademark Office*